Feb. 4, 1969     G. W. MICHELS     3,425,745
MOTORCYCLE ARMCHAIR SAFETY SEAT

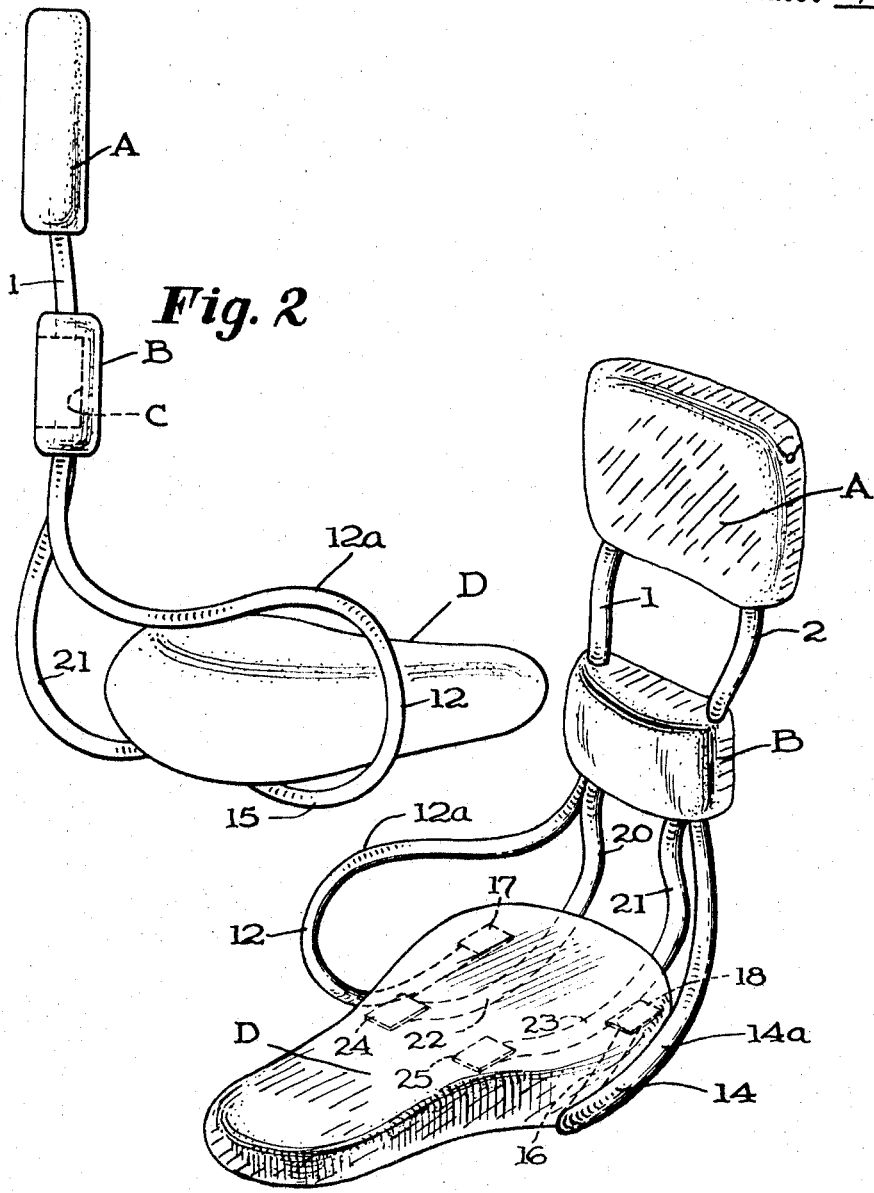

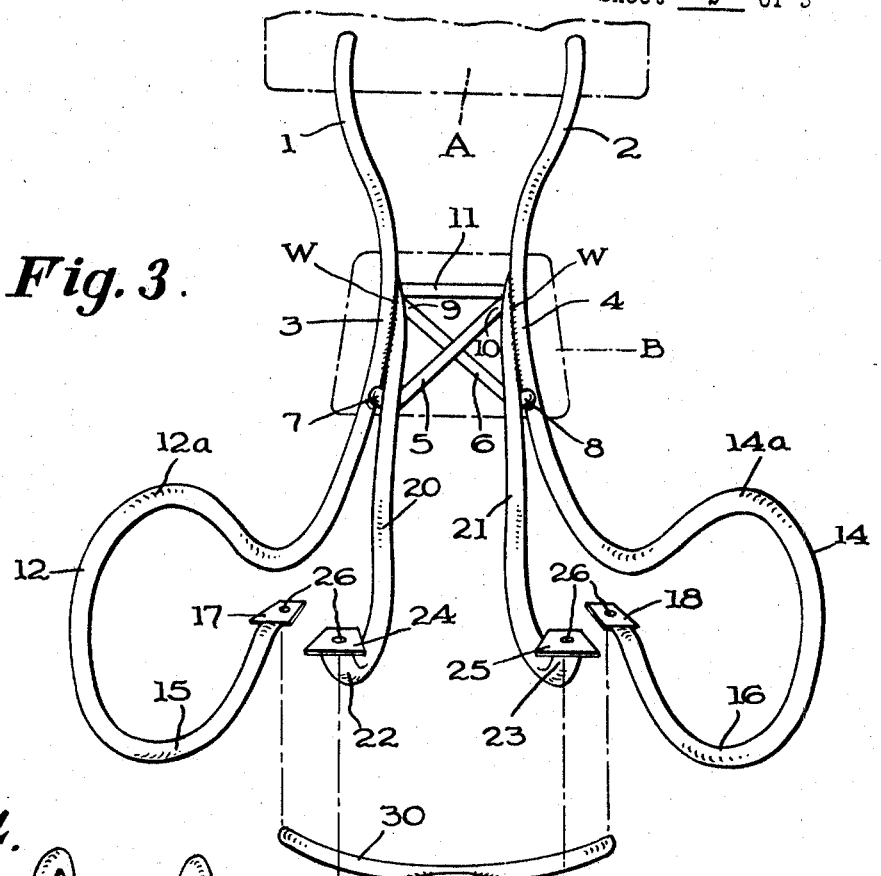
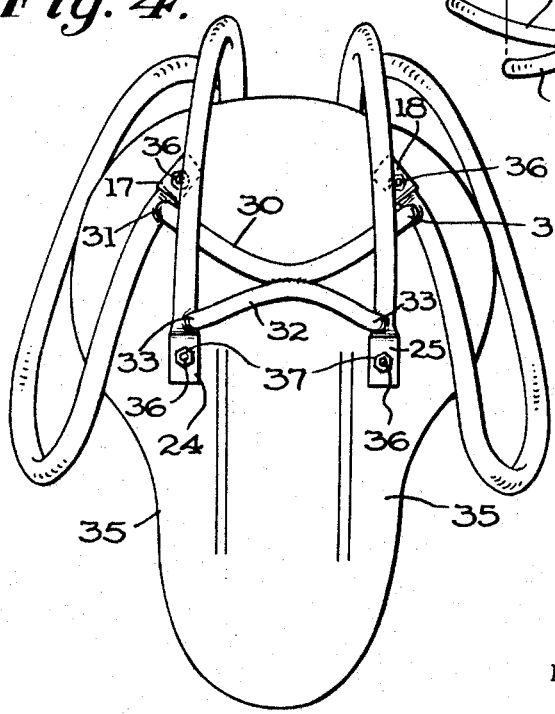
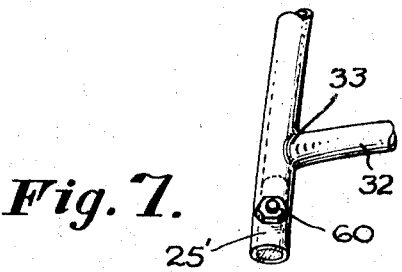

Filed June 9, 1967     Sheet 3 of 3

INVENTOR
Gerald W. Michels
BY Ralph L. Barrett
ATTORNEY

United States Patent Office 3,425,745
Patented Feb. 4, 1969

3,425,745
MOTORCYCLE ARMCHAIR SAFETY SEAT
Gerald W. Michels, East Troy, Wis.
(1544 N. 37th St., Milwaukee, Wis. 53208)
Filed June 9, 1967, Ser. No. 644,943
U.S. Cl. 297—195
Int. Cl. B62j 1/28; A47c 3/20
3 Claims

ABSTRACT OF THE DISCLOSURE

An armchair back structure for a motorcycle seat comprising inner and outer frames shaped to provide arm rests and seat back connections. The inner and outer frames include cross members forming braces to retain the inner and outer frames in their proper position.

---

Figure 5:
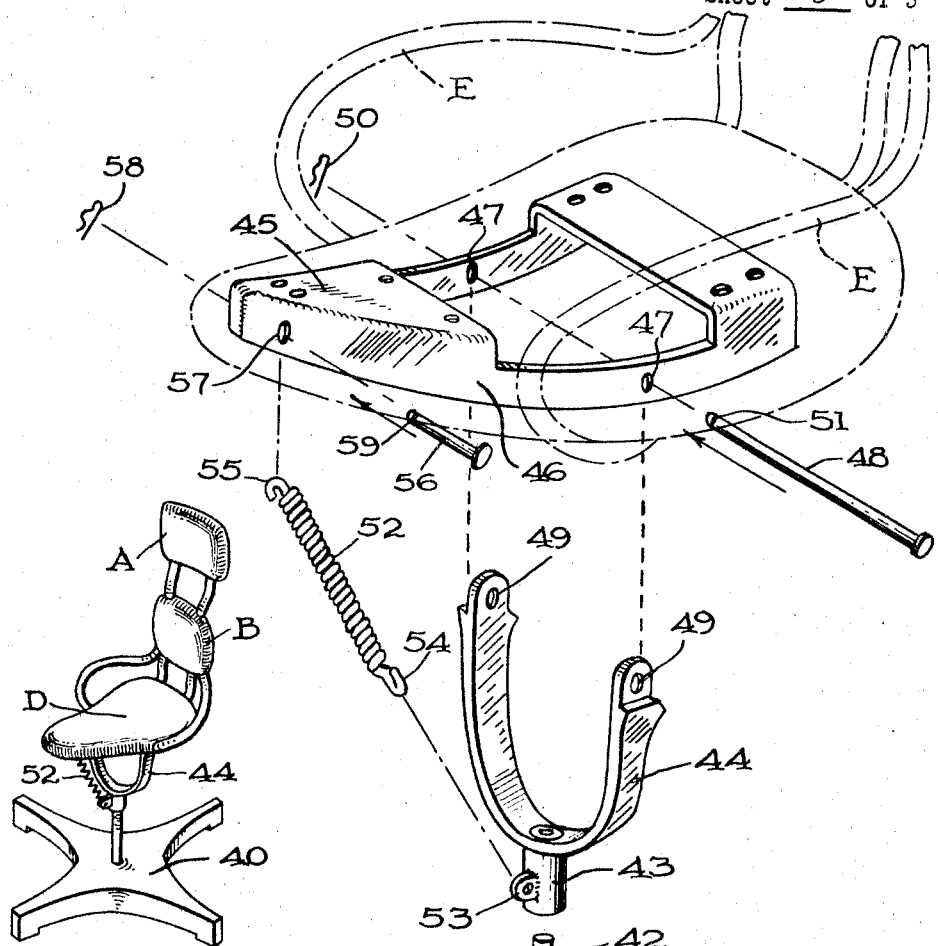

The present invention comprises an armchair back structure capable of use on a motorcycle or similar vehicle or as an indoor or outdoor swivel and tiltable chair seat and back, by attachment to the upper end of a vertical shaft having an appropriate mounting base. The armchair back structure is preferably formed of chrome or nickel-plated tubing, although it can be made from other suitable material such as aluminum and the like and finished in an appropriate manner to create a pleasing appearance.

The main object of the present invention is to provide an armchair structure which is capable of use either on a motorcycle or like vehicle or on a stool post, the structure embodying a novel decorative arrangement so constructed and arranged as to provide a light weight assembly having parts for supporting the body at appropriate points.

A further object of the invention is to provide a comfortable structure having rest points for the back of a rider on a motorcycle, the rest points being padded to prevent acceleration whip-lash and simultaneously provide handhold room for a rider which will prevent accidental falling from the vehicle due to its accelerated movements.

A further object of the invention is to provide for the support of small lights or signals at appropriate places and also provide luggage room for the accommodation of a fire extinguisher or like equipment.

Figure 6:
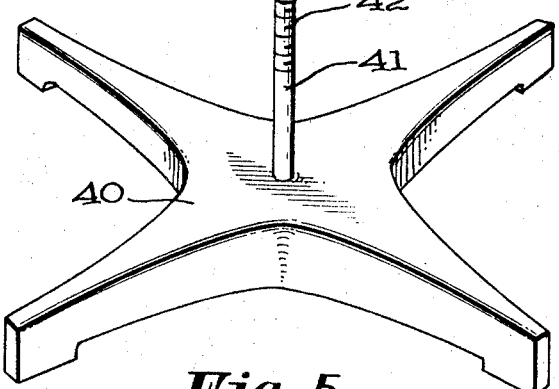

These and other objects of the invention will more clearly hereinafter appear by reference to the accompanying drawings forming a part of the instant specification and wherein like reference characters designate corresponding parts throughout the several views, in which:

FIG. 1 is a perspective view of the invention;
FIG. 2 is a side elevation;
FIG. 3 is a front elevation of the frame;
FIG. 4 is a bottom plan view showing the frame structure attached to a base plate;
FIG. 5 is an exploded view showing the application of the invention to a standard;
FIG. 6 shows the invention assembled on a standard; and
FIG. 7 is a fragmentary illustration showing a modified fastening for one of the frame terminals.

Referring to FIG. 1 it will be noted that the structure can be formed of any tubular material which provides the necessary strength and resiliency as well as decorative requisites. For instance, the structure can be formed of stainless steel, chrome or nickel-plated metal and includes a pair of outer frame members terminating at their upper ends in sockets or the like formed in an upper back member A. The upper ends of the outer frame members 1 and 2 are spaced a sufficient distance apart to provide a strong connection with the upper back member A and converge downwardly to a medial portion at 3 and 4 providing a restricted area for attachment to a second back support B. The medial portion of the back is connected by cross braces 5 and 6 which are welded at their out-turned terminals 7 and 8 to the outer frame members 3 and 4. The cross braces 5 and 6 are connected at their upper portions 9 and 10 to the inner faces of the frame member and at the junction of the upper ends of the cross braces 5 and 6 there is provided a rigid cross bar 11 which is connected together with the upper portion of the frame members 9 and 10 by welding or other means to the inner faces of the side frame members. From the medial portion the outer side frame members extend downwardly and laterally outwardly to provide a relatively wide seating area about which the frame members are formed into downwardly extending loops 12 and 14. The upper portions of the loops 12a and 14a are curved upwardly to provide handholds while the bottom portions of the loops 15 and 16 are turned rearwardly and converge inwardly, terminating in securing plates 17 and 18 for attachment to a base plate, as will be hereinafter described.

Inner frame members 20 and 21 extend downwardly from the medial portion of the outer frame members to which they are attached by welding or the like as at W for a substantial distance to brace this intermediate portion. The bottom portion of the inner frame members 20 and 21 extend below the terminals 17 and 18 of the outer frame members and then project upwardly as at 22 and 23 to merge into flat face portions 24 and 25 which, as in the case of the flat portions 17 and 18 of the outer frame members, are provided with openings therethrough as indicated at 26 for connection with studs to be hereinafter described.

The lower terminals of the outer frame members 3 and 4 and the inner frame members 20 and 21 are braced by a cross frame structure comprising a concave brace 30 connected at its ends 31 to the bottom faces of the lower ends of the outer frame members adjacent the connecting plates. The other cross frame structure 32 is of general inverted U-form and is welded at its medial portion to the medial portion of the frame member 30. The terminals 33 of the frame member 32 are welded to the end portions adjacent the connecting plates 24 and 25 by welding. By use of this cross brace and the U-shaped form of the two brace members and their association, the terminals of the outer frame members 3 and 4 and the inner frame members 20 and 21 are held in predetermined fixed positions for connection to the bottom of a seat plate 35, such as shown in FIG. 4 and which is normally provided with studs 36 which project downwardly from the plate. The frame terminals will be secured in position on the studs by nuts or suitable fastenings 37, as shown. The seat plate 35 will normally be cushioned by foam rubber or the like and appropriately covered to provide a seating area for the motorcycle occupant.

By the structure shown, a light portable backrest is provided of stable but resilient construction providing hand-holds at each side of the seat for a passenger. The terminals of the inner and outer frame members can readily be shifted to accommodate the placing of the studs normally extending from the bottom of a motorcycle seat.

In FIG. 2 the lower backrest B is shown as formed with a cavity C which can have a suitable closure and can hold a fire extinguisher or other equipment in accordance with the desires of the occupant of the vehicle.

In FIG. 5 there is shown a stool base 40 having a plurality of radial legs and a center post 41 threaded at its upper end 42 for threadedly receiving the inner threaded stud 43 carrying the yoke arm structure 44. A seat plate 45 formed of sheet metal and having a down-turned flange 46 is provided with aligned openings 47 for the passage of a pin 48 which is adapted to extend through opening 49 in the upper end of the yoke 44. A cotter pin or similar fastening 50 will be used to engage the slot 51 at the free end of the pin 48 to hold the parts in assembled position. Similarly, a hold-down spring 52 is connected at its lower end to the lug 53 by the hook 54 and at its upper end a hook 55 extends about a suitable pin 56 extending through a pair of aligned openings 57 and a cotter pin or the like 58 engages the groove 59 in the end of the pin 56 to hold the parts assembled. The spring will maintain the seat in its normal horizontal position but will permit a rocking movement of the seat on its pivot pin. At E there is illustrated in dotted lines the present back frame which can be applied to the seat plate and thus the seat frame and backrest structure can readily be adapted to an indoor stool or similar structure, as best shown in assembled form in FIG. 6.

In FIG. 7 there is illustrated an alternate means for securing the end portions of the frame members to the seat plate 35. This disclosure illustrates the alternate fastener at the terminal of one of the inner frame members outwardly of the member 32 as including a bolt 60 extending through the tubing 25′, the tubing preferably including a metal insert to provide for appropriate strength for the structure. The bolt 60 corresponds to the fastener 37 in the form of the invention shown in FIG. 4.

What I claim is:

1. In a seat structure for motorcycles and similar vehicles, a tubular frame structure including a pair of spaced outer frame members having diverging upper extremities for connection with an upper seat back, a converging medial portion and looped lower portions, said looped lower portions being laterally spaced with their terminals extending inwardly and terminating in flat connecting plates, inner tubular members connected at their upper extremities to the inner faces of the converging medial portions of the outer frame members, said inner frame members extending downwardly below the terminals of the outer frame members and being bent upwardly and terminating in connecting plates formed forwardly of the flat terminals of the outer frame members, a cross frame member connecting the medial portion of the outer frame members, a cross member welded at its ends to the upper portion of said cross frame member and to the outer frame member, a lower back supporting portion forming a cushion and fixed about the medial portion of the outer frame members, and a plate member for supporting a seat, said plate members having depending studs fixed to the flat terminals of the inner and outer frame members.

2. The structure of claim 1 characterized in that a cross frame structure comprising two oppositely curved tubular members welded together at their medial points have rigid connections with the end portions of the lower portions of the inner and outer frame members at points adjacent the flat connecting plates.

3. In a seat structure for motorcycles and similar vehicles, a tubular frame structure including a pair of spaced outer frame members having diverging upper extremities for connection with an upper seat back, a converging medial portion and looped lower portions, said looped lower portions being laterally spaced with their terminals extending inwardly to end securing portions, inner tubular members connected at their upper extremities to the inner faces of the converging medial portions of the outer frame members, said inner frame members extending downwardly below the terminals of the outer frame members and being bent upwardly to horizontal end connecting portions, a cross frame member connecting the medial portion of the outer frame members, a lower back supporting portion forming a cushion and fixed about the medial portion of the outer frame members, and a plate member for supporting a seat, said plate member having depending studs fixed to the end securing portions.

References Cited

UNITED STATES PATENTS

| | | | |
|---|---|---|---|
| 625,377 | 5/1899 | Blood et al. | 280—202 |
| 645,668 | 3/1900 | Lemoon | 280—202 |
| 705,488 | 7/1902 | Uhl | 297—451 |
| 1,037,216 | 9/1912 | De Young | 280—202 |
| 1,961,145 | 6/1934 | Harley et al. | 297—195 X |
| 2,519,027 | 8/1950 | Disney et al. | 297—195 X |

FOREIGN PATENTS

| | | |
|---|---|---|
| 32,592 | 11/1923 | Denmark. |
| 8,377 | 1/1908 | France. |

JAMES T. McCALL, *Primary Examiner.*

U.S. Cl. X.R.

297—451